United States Patent
Chen et al.

(10) Patent No.: US 7,332,131 B2
(45) Date of Patent: Feb. 19, 2008

(54) APPARATUS AND METHOD FOR ACHIEVING A DESIREABLE FEED/CATALYST CONTACTING CONDITION IN FLUID CATALYTIC CRACKING UNITS

(75) Inventors: Ye-Mon Chen, Sugar Land, TX (US); Rene Samson, Amsterdam (NL)

(73) Assignee: Shell Oil Company, Houston, TX (US)

( * ) Notice: Subject to any disclaimer, the term of this patent is extended or adjusted under 35 U.S.C. 154(b) by 722 days.

(21) Appl. No.: 10/800,785

(22) Filed: Mar. 15, 2004

(65) Prior Publication Data

US 2005/0201905 A1  Sep. 15, 2005

(51) Int. Cl.
 *B01J 8/18* (2006.01)
 *B01J 19/26* (2006.01)
 *B01J 8/08* (2006.01)
 *F27B 15/08* (2006.01)

(52) U.S. Cl. ............... 422/140; 422/145; 422/214

(58) Field of Classification Search ......... 422/139, 422/140, 214
See application file for complete search history.

(56) References Cited

U.S. PATENT DOCUMENTS

| | | | | |
|---|---|---|---|---|
| 3,152,065 A | | 10/1964 | Sharp et al. | 208/157 |
| 4,778,658 A | * | 10/1988 | Nielsen | 422/140 |
| 4,808,383 A | | 2/1989 | Buyan et al. | 422/140 |
| 5,979,799 A | | 11/1999 | Chen et al. | 239/430 |
| 6,387,247 B1 | | 5/2002 | Chen | 208/113 |

FOREIGN PATENT DOCUMENTS

| | | |
|---|---|---|
| FR | 2644795 | 9/1990 |
| GB | 2085748 A | 5/1982 |

OTHER PUBLICATIONS

International Search Report for PCT/US2005/008231 of Jun. 30, 2005.
Written Opinion for PCT/US2005/008231 of Jun. 30, 2005.

* cited by examiner

*Primary Examiner*—Glenn Caldarola
*Assistant Examiner*—Randy Boyer
(74) *Attorney, Agent, or Firm*—William E. Hickman

(57) ABSTRACT

A feed nozzle assembly located near the bottom of an FCC riser reactor includes a plurality of feed nozzles, each feed nozzle including a discharge end which is angled toward the center of the riser. The angled discharged ends provide a combined discharge of hydrocarbon feed and atomization gas into the central portion of the riser thereby providing a desirable feed/catalyst contact condition while preventing impingement of the feed upon the riser walls.

15 Claims, 4 Drawing Sheets

APPARATUS AND METHOD FOR ACHIEVING A DESIREABLE FEED/CATALYST CONTACTING CONDITION IN FLUID CATALYTIC CRACKING UNITS

BACKGROUND OF THE INVENTION

1. Field of the Invention

This invention relates to a method and apparatus for improving fluid catalytic cracking (FCC) feed nozzle performance and reliability. More particularly, the invention is directed to a nozzle assembly located near the bottom of the riser reactor for achieving a desirable feed/catalyst contacting condition similar to the modern side entry feed nozzles located at an elevated riser location, but without the need to change the riser, thus substantially reducing the capital cost required to benefit from achieving such a desirable feed/catalyst contact condition.

2. Description of Related Art

As is well known, a typical fluid catalytic cracking (FCC) unit consists of a reactor and a regenerator. Long chain hydrocarbon, such as vacuum gas oil, is injected into the riser reactor through feed nozzles to contact with hot, regenerated catalyst to crack into small, more valuable products, such as gasoline. The catalyst is temporarily deactivated in the riser reactor during the reaction due to the deposition of a coke layer on the surface. The product gas is separated out at the top of the reactor and sent to the product recovery system. Spent catalyst is then transported to the stripper where steam is introduced to recover gas products trapped in the spent catalyst. The stripped spent catalyst is then transported to the regenerator where air is introduced to burn off the coke layer on the surface to reactivate the catalyst. The regenerated catalyst is then transferred back to the riser reactor, which completes the catalyst circulation cycle.

An FCC feed nozzle is critical to unit performance. It determines the uniformity of initial contact of feed with the regenerated catalyst, which has profound effects on dry gas yield and coke selectivity. Most modern FCC feed nozzles are side-entry nozzles that are installed on the periphery of the vertical riser section at an elevated location. This is the preferred option for a grass-root FCC. However, some older FCC units still have feed injection systems located at the bottom of the riser and there could be limitations, such as high capital cost and the pressure-balance of the unit, to convert these units to vertical risers with modern side entry nozzles. The riser, at the location of the bottom injection feed nozzles, may be oriented either horizontally, vertically or inclined.

Applicant's U.S. Pat. No. 5,979,799 discloses a side entry nozzle having a spray pattern that is angled upwardly at an angle of up to 30° from the axis of the nozzle.

Applicant's U.S. Pat. No. 6,387,247B1 discloses a nozzle tip design for a single, centrally located bottom entry nozzle having an upward discharge of from about 10° to about 80° from the axis of the nozzle.

U.S. Pat. No. 4,778,658 to Nielsen discloses a single, centrally located bottom-feed nozzle having angled injection quills for injecting hydrocarbon into an enclosure mixing chamber inside the feed nozzle for better mixing of hydrocarbons and steam, and better atomization prior to injecting the hydrocarbon/steam mixture into the riser for contacting with the catalyst.

U.S. Pat. No. 4,808,383 to Buyan discloses a bottom-feed injection system consisting of multiple feed nozzles with their axis and discharge ends parallel to the axis of the riser.

SUMMARY OF THE INVENTION

A feed nozzle assembly located near the bottom of an FCC riser reactor includes a plurality of feed nozzles, each feed nozzle including a discharge end which is angled toward the center of the riser. The angled discharged ends provide a combined discharge of hydrocarbon feed and atomization gas into the central portion of the riser thereby providing a desirable feed/catalyst contact condition while preventing impingement of the feed upon the riser walls

DESCRIPTION OF PREFERRED EMBODIMENTS

One objective of the instant invention is to improve catalyst/feed contacting for FCC units with a feed injection system located near the bottom of the riser reactor. Another objective of the instant invention is to improve feed distribution in the riser. Yet another objective is to reduce the rate of fouling (coking) of riser walls. Yet another objective of the instant invention is to improve catalyst circulation of the unit.

Applicants' invention is primarily directed to improving feed/catalyst contact. Thus, in Applicants' invention, the catalyst makes contact with the hydrocarbon/steam spray immediately after its exit from the discharge end of the individual nozzles. One essential element is thus that the discharge end of the nozzle is surrounded on all sides by catalyst. The instant invention with multiple nozzles providing multiple contacting areas with the catalyst is an improvement over the prior arts of a single, centrally located bottom entry nozzle, such as Applicant's U.S. Pat. No. 6,387,247B1 and U.S. Pat. No. 4,778,658 to Nielsen.

The instant invention is also a new and improved design of the prior art of U.S. Pat. No. 4,808,383 to Buyan noted above. The prior art of U.S. Pat. No. 4,808,383 discloses a bottom-feed injection system consisting of multiple nozzles, but with their axis and discharge ends parallel to the axis of the riser. Due to the fact that the discharges from these nozzles are parallel to the riser axis, it cannot achieve desirable feed distribution in the riser. If the discharge of each nozzle in U.S. Pat. No. 4,808,383 were to expand quickly to cover a larger area, it will impinge on the riser wall, leading to mechanical damages. One essential element of the instant invention is that the discharge ends of individual nozzles are canted toward the center of the riser. This allows the individual discharges of the instant invention to expand quickly and to provide desirable feed distribution in the riser, but without the drawback of impinging on the riser wall.

The instant invention provides an alternative to achieve a desirable feed/catalyst contacting condition near the bottom of the riser similar to the modern side entry feed nozzles located at an elevated riser location (see Applicant's U.S. Pat. No. 5,979,799 noted above), but without the need to change the riser, thus substantially reducing the capital cost.

Figure 1:
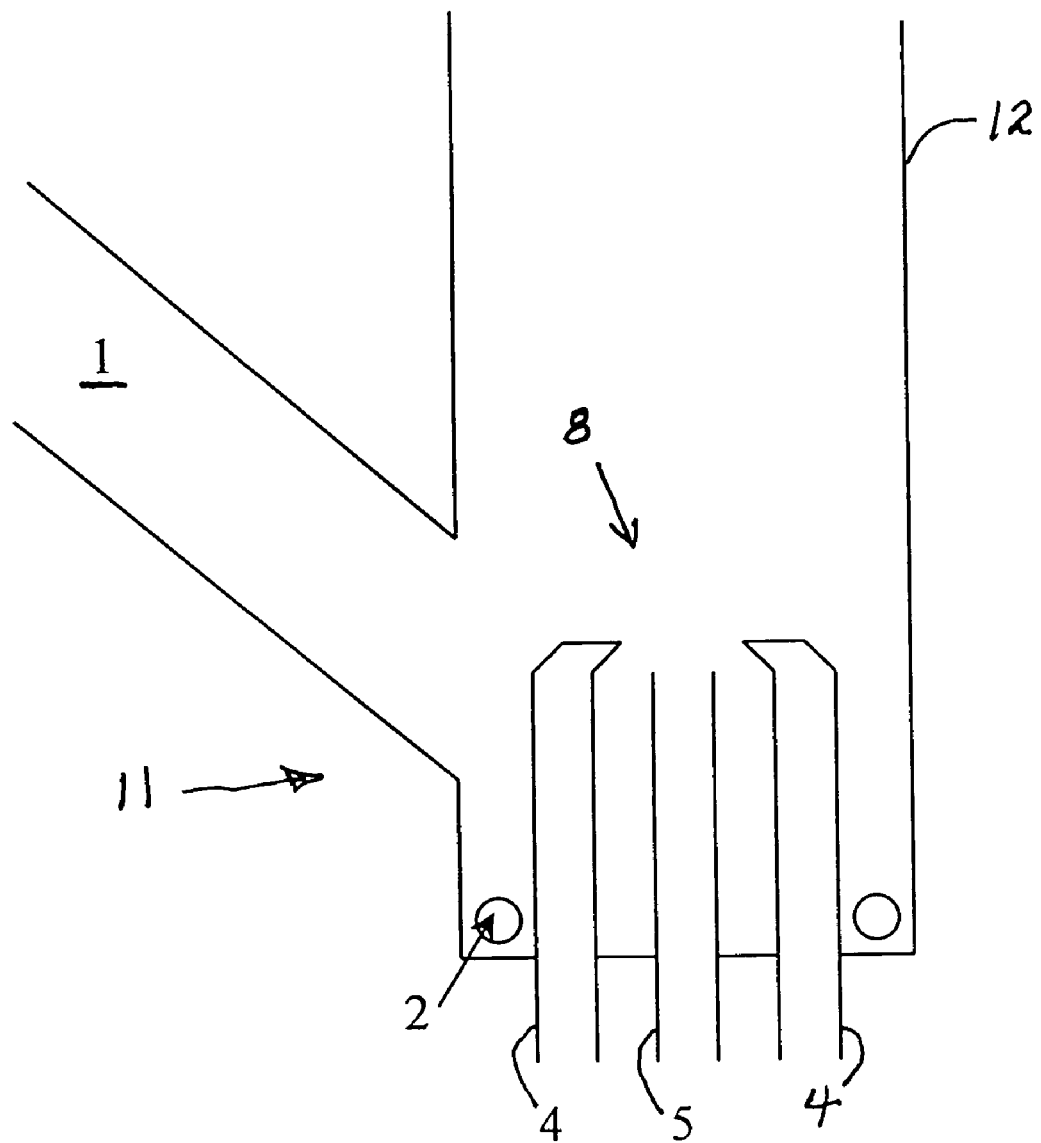
FIG. 1 is an elevation view of a riser liftpot with standpipe, feed nozzle assembly and pre-fluidizing ring as used in the present invention.

FIG. 1 is an elevation cross-sectional view of the bottom section of a riser with standpipe, feed nozzle assembly and pre-fluidizing ring as used in the present invention. Catalyst is received through standpipe 1 and encounters feed nozzles 4 located at the bottom 11 of the riser 12. An emergency steam nozzle 5 is centered along the axis of the nozzles 4. The axis of feed nozzles 4 is parallel to the axis of the riser at the bottom, but the discharge ends of the nozzles are canted, as shown more clearly in FIG. 5, towards the center of the reactor. A fluidizing ring 2 surrounds the nozzles 4 (more clearly shown in FIG. 3.) for assisting catalyst movement into the riser. This figure shows that the bottom section of the riser is vertical. However, same feed nozzle arrangement can be applied when the bottom riser section is horizontal or inclined.

Figure 2:
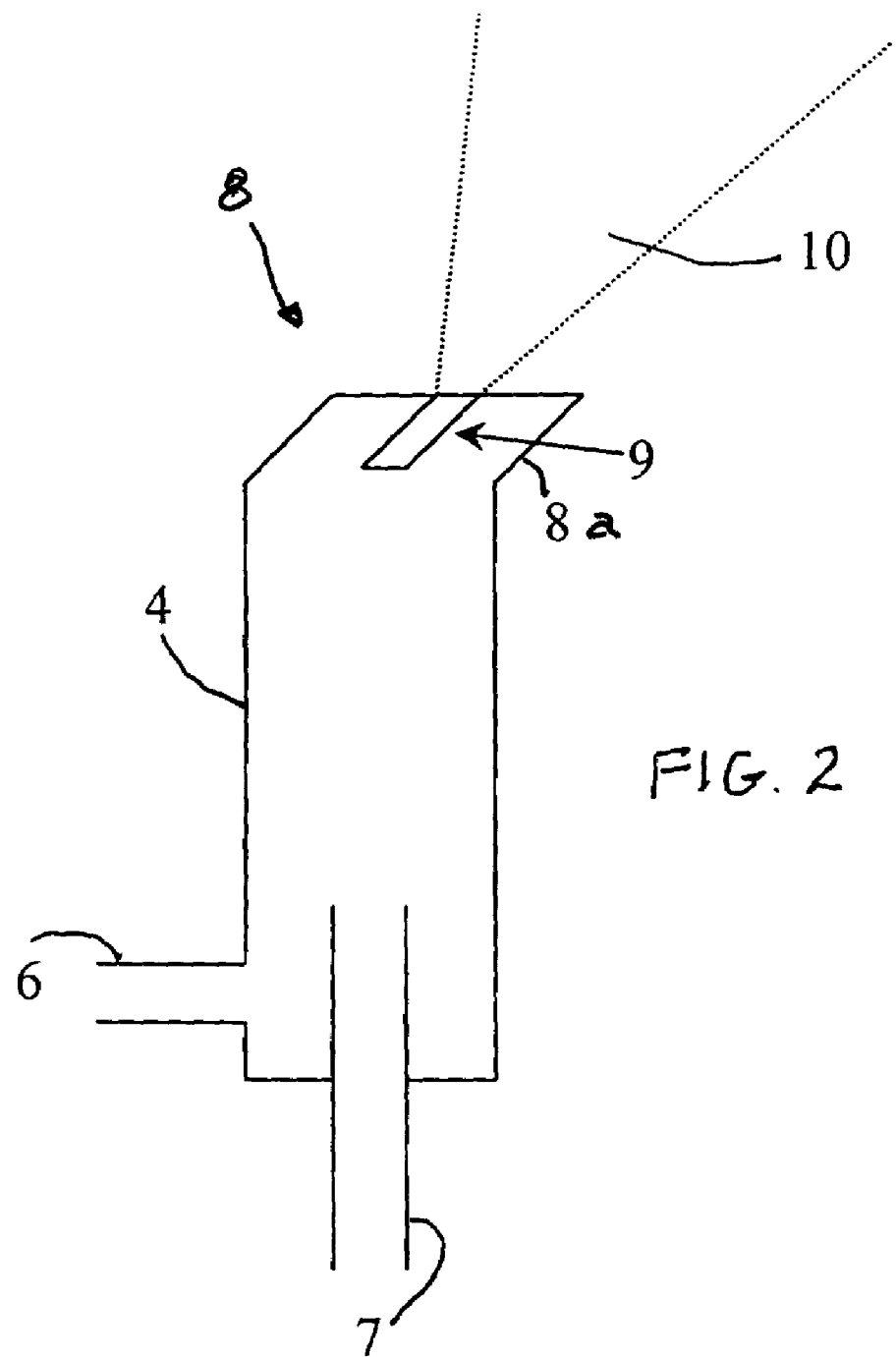
FIG. 2 is a schematic view of the feed nozzle according to the present invention.

FIG. 2 is a schematic view of a single feed nozzle 4 according to the present invention. The nozzle 4 includes an oil inlet 6 and a steam inlet 7. The emergency steam nozzle 5, which is centered in the nozzle assembly, is not shown for clarity but is clearly shown in FIG. 3. The discharge end 8 of the nozzle 4 is tilted (canted) as shown at 8a. The oil from oil inlet 6 and steam from steam inlet 7 are mixed inside nozzle 4 and the mixture of oil and steam is ejected through a common opening 9 at the discharge end 8 of nozzle 4 and forms an oil-steam spray 10 to be subsequently described.

Figure 3:
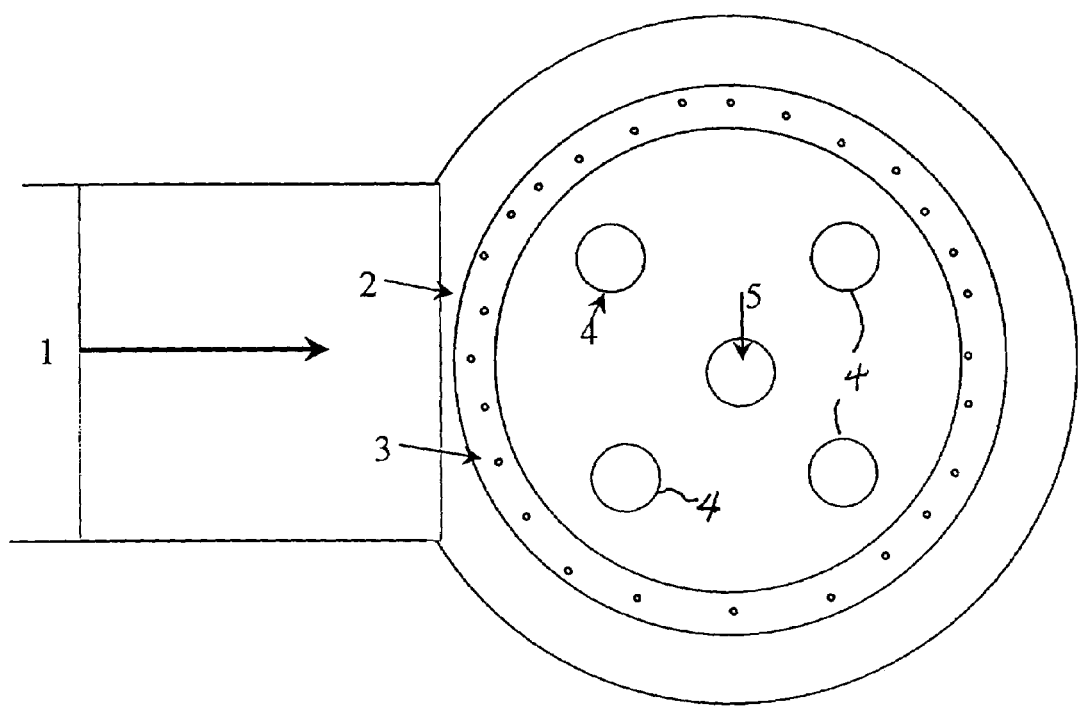
FIG. 3 is a plan view of the riser liftpot with feed nozzle assembly, standpipe, pre-fluidizing ring and emergency nozzle of FIG. 1.

FIG. 3 is a cross-sectional plan view of the bottom of the riser with feed nozzle assembly, standpipe, pre-fluidizing ring and emergency nozzle according to FIGS. 1 and 2. FIG. 3 more clearly shows the arrangement of the nozzles 4, the emergency steam nozzle 5 and the fluidizing ring 2. Also shown are the orifices 3 in fluidizing ring 2.

Figure 4:
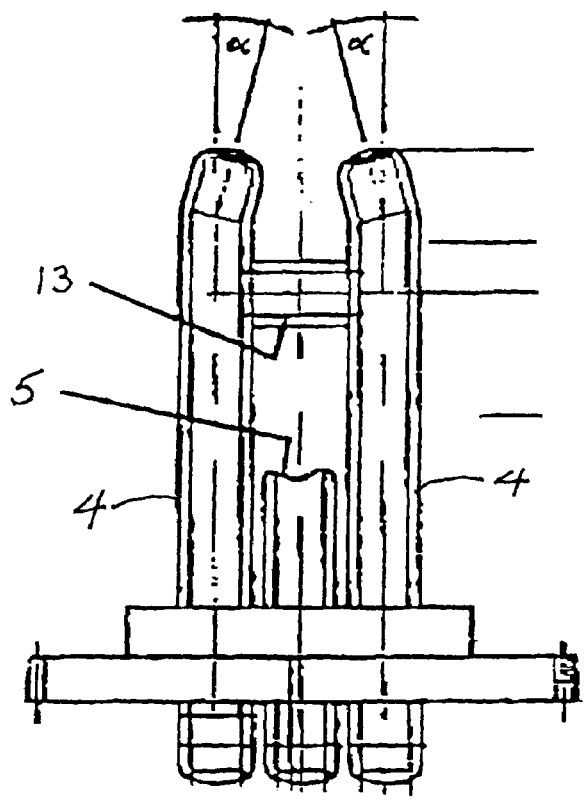
FIG. 4 is a side view of the elevation feed, steam nozzle assembly.

Referring now to FIG. 4, a nozzle assembly is shown having an emergency steam injection nozzle 5 positioned centrally of the nozzle-assembly longitudinal axis. Surrounding the emergency steam injection nozzle 5 is a plurality, e.g., four feed injection nozzles 4. The feed nozzles 4 are maintained in a fixed position relative to the emergency steam nozzle 5 and each other, by a series of braces 13 interconnecting the feed nozzles 4 and the steam nozzle 5. The individual nozzles 4 have at least one inlet end 6 for receiving hydrocarbon feed and at least another inlet end 7 for receiving atomization gas, say steam as shown in FIG. 2. The atomization gas is mixed with the hydrocarbon feed inside the nozzle 4 and the mixture is discharged through a common opening 9 in a discharge end 8 into the riser 12 in the form of a fine spray. The individual discharge ends 8 of the feed nozzles 4 are canted by an angle α, say 5° to 75° from their longitudinal axis and more preferably say 10° to 40° from their longitudinal axis, toward the axis of the riser 12 so that the fine spray of hydrocarbon feed being ejected therefrom will form a desirable contact condition with catalyst similar to the modern side-entry nozzles at an elevated location while not impinging on the riser wall. The desirable contact condition will also lead to fast vaporization of the feed and acceleration of catalyst in the riser, thus assisting catalyst circulation of the FCC unit.

Figure 5:
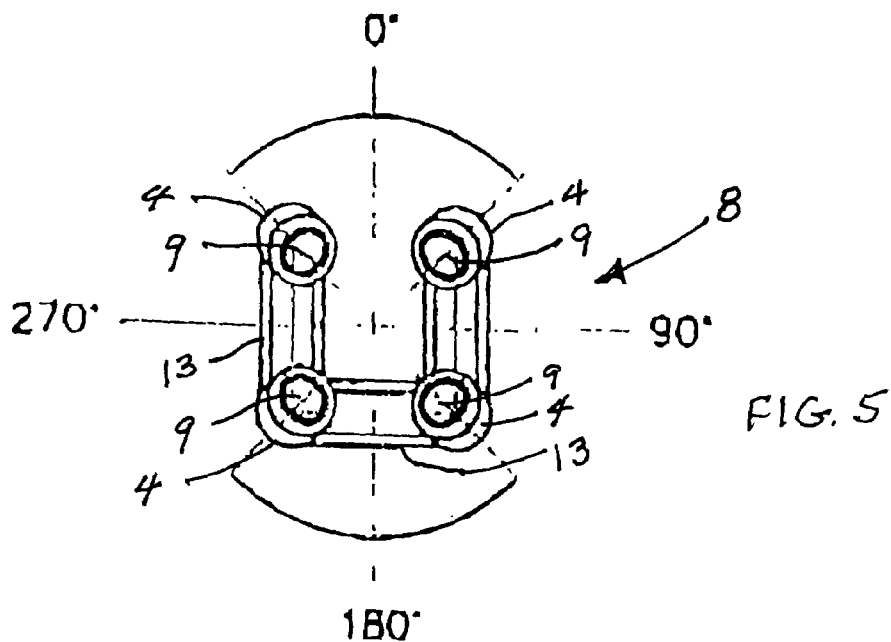
FIG. 5 is an end view of FIG. 4.

Referring now to FIG. 5 an end view of the nozzle assembly of FIG. 4 is shown. The four discharge ends 8 terminating the feed nozzles 4 are shown in their relative positions canted by the aforementioned 5° to 75° from their longitudinal axis and more preferably, say 10° to 40° from their longitudinal axis toward the axis of the riser 12. The four individual nozzles 4 may be positioned as equally spaced, e.g., at the vertices of a square around the center of the riser. However, the individual nozzles 4 may also be positioned with non-equal spacing. For instance, for a horizontal riser, it is desirable to direct more hydrocarbon feed toward the bottom thereof. The spacing between the individual nozzles 4 can be reduced near the bottom and increased near the top to achieve such uneven locations of nozzles 4, and hence the hydrocarbon distribution. The discharge opening of feed nozzle 4 is shown to have a shape of a continuous circular gap. This opening will result in a spray pattern of a hollow cone spray from each nozzle, as the oil-steam spray 10 in FIG. 2. Other shapes of openings, such as elongated slot(s) or circular orifice(s), known in the art of feed nozzles, can also be applied and which will result in different spray patterns from each nozzle.

In many riser inlet configurations there is a zone below the discharge end 8 of the feed nozzles 4 where there is a risk that catalyst might settle and lose its fluidity. This would have a negative impact on the ability of the operator to circulate catalyst through the unit at any desired circulation rate. In extreme cases this might even lead to complete stagnation of the catalyst circulation. Clearly, this is a risk that is to be avoided. Designers of FCC units have found various ways and means to overcome these problems. A solution to this problem is to install a device to distribute fluidizing gas at a low elevation in the riser. Usually, steam is used for this purpose, but other gases could be used as well. These so-called pre-fluidizing devices, shown at 2 in FIG. 2, could take a number of different shapes. Rings with a number of nozzles, or orifices 3, (either pointing upwards or downwards) distributed along its periphery are often used, as well as perforated plates. Some designers also position inlet points for fluidizing gas along the very last stretch of standpipe or J-bend before it joins the riser. These inlet points will usually be positioned near the lower end of the standpipe, so that injected-gas makes good contact with the catalyst.

Although application of the invention disclosed herein might be less vulnerable to the risk of reduced circulation than side-entry nozzles at a higher elevation, these risks may still exist. A designer will minimize these risks by the use of a pre-fluidizing device, as described above. He/she will consider carefully how to make the layout of the bottom of the riser so as to accommodate all the different components—the different feed nozzles, optionally a separate emergency steam nozzle and optionally a separate pre-fluidizing distribution device.

Although the nozzles are called bottom-entry nozzles and although the feed nozzles are usually straight tubes that perforate the riser bottom, this need not necessarily be the case. They could equally well be tubes that perforate the riser walls and then make a 90-degree turn, from perpendicular to the riser axis to parallel to the riser axis.

What is claimed is:

1. A nozzle assembly located at the bottom of an FCC riser comprising:
    a plurality of feed nozzles;
    a catalyst source within the riser;
    a discharge end of each said feed nozzle for ejecting a mixture of hydrocarbon feed and atomization gas into said riser; and a mixing zone at the discharge end of at least one feed nozzle such that the mixture is fed into the catalyst;

wherein each nozzle has its axis parallel to the axis of said riser at the bottom, and said discharge ends of said nozzles are canted inwardly towards the axis of said riser at the bottom.

2. The nozzle assembly of claim 1 wherein said discharge ends are canted 5° to 75° from their axes.

3. The apparatus of claim 1 further including a mechanical connecting means for physically fixing the position of said feed nozzles with respect to each other.

4. The apparatus of claim 1 further including a central steam nozzle for supplying emergency steam.

5. The apparatus of claim 1 further including a means for supplying pre-fluidizing gas.

6. The apparatus of claim 1 wherein said nozzles are arranged equi-distant around said riser axis.

7. The apparatus of claim 6 wherein said nozzles are arranged evenly-spaced in said riser.

8. The apparatus of claim 6 wherein said nozzles are arranged unevenly-spaced in said riser when said riser is positioned horizontally or inclined.

9. The apparatus of claim 1 wherein the number of said nozzles is in the range of two to eight.

10. The apparatus of claim 2 further including a mechanical connecting means for physically fixing the position of said feed nozzles with respect to each other.

11. The apparatus of claim 2 further including a central steam nozzle for supplying emergency steam.

12. The apparatus of claim 2 further including a means for supplying pre-fluidizing gas.

13. The apparatus of claim 2 wherein said nozzles are arranged equi-distant around said riser axis.

14. The apparatus of claim 2 wherein the number of said nozzles is in the range of two to eight.

15. An apparatus for contacting a catalyst and hydrocarbon feed in a fluid catalytic cracking process comprising: a first conduit for supplying regenerated catalyst; a second conduit having an opening connected to the outlet end of said first conduit for receiving said regenerated catalyst; and, a feed nozzle assembly located within said second conduit for supplying a mixture of hydrocarbon feed and steam into said catalyst, said feed nozzle assembly within said second conduit comprising a plurality of feed nozzles, and wherein the axis of each nozzle is parallel to the axis of said second conduit at the bottom, wherein each nozzle includes a discharge end canted inwardly toward the axis of said second conduit for ejecting said hydrocarbon feed and atomization steam therefrom and into said second conduit to contact with said regenerated catalyst.

* * * * *